(12) United States Patent
Schaller et al.

(10) Patent No.: US 12,474,314 B2
(45) Date of Patent: Nov. 18, 2025

(54) GAS SENSOR WITH A SENSOR ELEMENT AND A FLAME ARRESTER AND USE OF THE SAME FOR THE DETECTION OF GASES

(71) Applicant: Infineon Technologies AG, Neubiberg (DE)

(72) Inventors: Rainer Markus Schaller, Saal a.d. Donau (DE); Matthias Eberl, Taufkirchen (DE); Christoph Steiner, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 628 days.

(21) Appl. No.: 17/808,711

(22) Filed: Jun. 24, 2022

(65) Prior Publication Data

US 2023/0009285 A1    Jan. 12, 2023

(30) Foreign Application Priority Data

Jul. 9, 2021   (DE) .......................... 102021117778.2

(51) Int. Cl.
G01N 33/00    (2006.01)
(52) U.S. Cl.
CPC ................. G01N 33/005 (2013.01)
(58) Field of Classification Search
CPC ...... G01N 27/22; G01N 27/406; G01N 27/74; G01N 29/07; G01N 33/00; G01N 21/01; G01N 27/00; G01N 27/12; G01N 27/16; G01N 27/18; G01N 27/127; G01N 25/22; G01N 27/125; G01N 27/4071; G01N 27/223; G01N 27/04; H01M 8/0444; B81B 7/02; G01D 11/24; G01L 9/0042; G01L 19/00; G01M 3/04
See application file for complete search history.

(56) References Cited

U.S. PATENT DOCUMENTS

| 2013/0209315 A1* | 8/2013 | Kimura | G01N 25/4826 422/88 |
| 2016/0109419 A1* | 4/2016 | Matsui | B01D 46/0002 264/274 |
| 2016/0202200 A1* | 7/2016 | Nakano | G01N 33/0067 73/23.31 |

FOREIGN PATENT DOCUMENTS

| DE | 20301081 U1 | 5/2003 |
| DE | 102014016636 A1 | 5/2015 |
| DE | 102017005713 A1 | 12/2018 |

* cited by examiner

*Primary Examiner* — Brandi N Hopkins
(74) *Attorney, Agent, or Firm* — Harrity & Harrity, LLP

(57) ABSTRACT

A gas sensor comprises a sensor element for the detection of a gas, an encapsulation, which surrounds the sensor element and has an opening for a gas to be detected to pass through to the sensor element, and a flame arrester, which is arranged in the opening of the encapsulation.

18 Claims, 5 Drawing Sheets

GAS SENSOR WITH A SENSOR ELEMENT AND A FLAME ARRESTER AND USE OF THE SAME FOR THE DETECTION OF GASES

CROSS REFERENCE TO RELATED APPLICATION

This application claims priority to German Patent Application No. 102021117778.2 filed on Jul. 9, 2021, the content of which is incorporated by reference herein in its entirety.

TECHNICAL FIELD

The present disclosure concerns a gas sensor, and the use of the same for the detection of gases, in particular of hydrogen.

BACKGROUND

In the field of electromobility, the fuel cell is becoming increasingly important. The operation of fuel cells relies primarily on hydrogen. A fuel cell system operated with hydrogen gas ($H_2$) has one or more hydrogen storage tanks in addition to a fuel cell. Such hydrogen storage tanks, for example when used in a motor vehicle, can be configured as cylinders in which the hydrogen is stored under an elevated pressure of approximately 700 bar. If a number of such hydrogen storage tanks are installed in the motor vehicle, a range of the motor vehicle can be configured accordingly.

For the operation of a fuel cell system in a motor vehicle the safety aspect is of particular importance. Since gaseous hydrogen reacts exothermally with oxygen from the air over a wide ignition range, even with low ignition energy (explosive gas reaction), it is extremely important to detect, safely and reliably, the presence of hydrogen outside the hydrogen storage tanks and the fuel cell, the supply and discharge lines.

Used for the detection of hydrogen are gas sensors which are flange-mounted in a suitable way on tanks or lines and can for example determine the partial pressure of the hydrogen in a water/hydrogen mixture. During operation, such gas sensors may produce heat, which can spread in the direction of the tank or the line.

These and other reasons motivate a need for the present disclosure.

SUMMARY

A first aspect of the present disclosure concerns a gas sensor, comprising a sensor element for the detection of a gas, an encapsulation, which surrounds the sensor element and has an opening for a gas to be detected to pass through to the sensor element, and a flame arrester, which is arranged in the opening of the encapsulation.

A second aspect of the present disclosure concerns a gas sensor, comprising a substrate, which has a laminate layer, a sensor element, applied to a main surface of the substrate, for the detection of a gas, a cover, which covers the sensor element and is connected to the main surface, and a flame arrester, which takes the form of through-holes in the cover and/or an opening in the substrate.

A third aspect of the present disclosure concerns a gas sensor, comprising a sensor element for the detection of a gas, an encapsulation, which surrounds the sensor element and has an opening for a gas to be detected to pass through to the sensor element, external electrical contacts, a redistribution layer, which is arranged between the sensor element and the external electrical contacts, and a flame arrester, which is arranged in the redistribution layer.

A fourth aspect of the present disclosure concerns the use of a gas sensor according to the first, second or third aspect for the detection of a gas, in particular of hydrogen.

BRIEF DESCRIPTION OF THE DRAWINGS

A gas sensor according to the disclosure is explained in more detail below based on drawings. The elements shown in the drawings are not necessarily reproduced true to scale with respect to one another. Identical reference signs may designate identical components. The same reference numbers denote corresponding parts that are the same or similar.

DETAILED DESCRIPTION

In the following detailed description, reference is made to the accompanying drawings, which form a part of this description and in which are shown by way of illustration specific implementations in which the disclosure can be put into practice. In this regard, directional terminology, such as "top", "bottom", "front", "back", leading", "trailing", etc., is used with reference to the orientation of the figure(s) being described. Because the component parts of implementations can be positioned in various orientations, the directional terminology is used for the purpose of illustration and is in no way limiting. It is to be understood that other implementations can also be used and that structural or logical changes can be made without exceeding the scope of the present disclosure. The following detailed description is therefore not to be taken in a limiting sense, and the scope of the present disclosure is defined by the appended claims.

It should be noted that the features of the various example implementations described here can be combined with one another, unless expressly stated otherwise.

As used in this description, the terms "bonded", "attached", "connected", "coupled" and/or "electrically connected/electrically coupled" do not mean that the elements or layers must be directly in contact with each other; intermediate elements or layers can be provided between the "bonded", "attached", "connected", "coupled" and/or "electrically connected/electrically coupled" elements. According to the disclosure, however, the above terms may optionally also have the specific meaning that the elements or layers are directly in contact with each other, e.g., that no intermediate elements or layers are provided between the "bonded", "attached", "connected", "coupled" and/or "electrically connected/electrically coupled" elements.

In addition, the word "over" used in relation to a part, an element or a material layer that is formed or arranged "over" a surface may mean herein that the part, element or material layer is "indirectly" arranged (for example, placed, formed, deposited, etc.) on the implied surface, with one or more additional parts, elements or layers being arranged between the implied surface and the part, element or material layer. However, the word "over" used in relation to a part, an element or a material layer that is formed or arranged "over" a surface can optionally also have the specific meaning that the part, the element or material layer is arranged (e.g., placed, molded, deposited, etc.) "directly on", e.g., in direct contact with, the implied surface.

Figure 1:
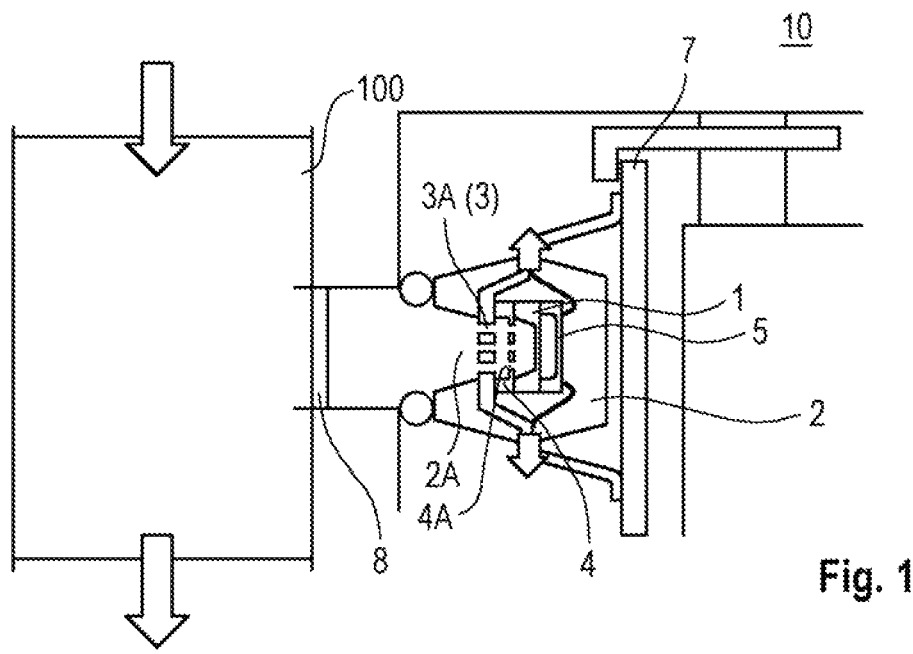
FIG. 1 shows a lateral cross-sectional view of an example implementation of a gas sensor according to the first aspect which has a sensor element and a flame arrester, which is formed by openings in a leadframe and openings in a glass substrate.
Figure 2A:
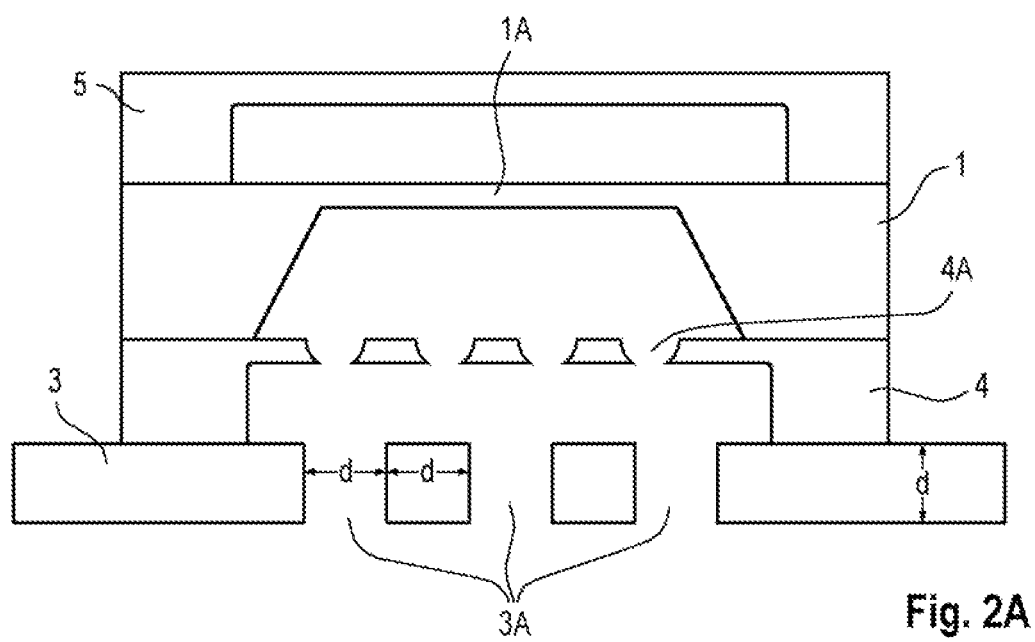
FIG. 2A shows a lateral cross-sectional view of a part of a gas sensor according to FIG. 1
Figure 2B:
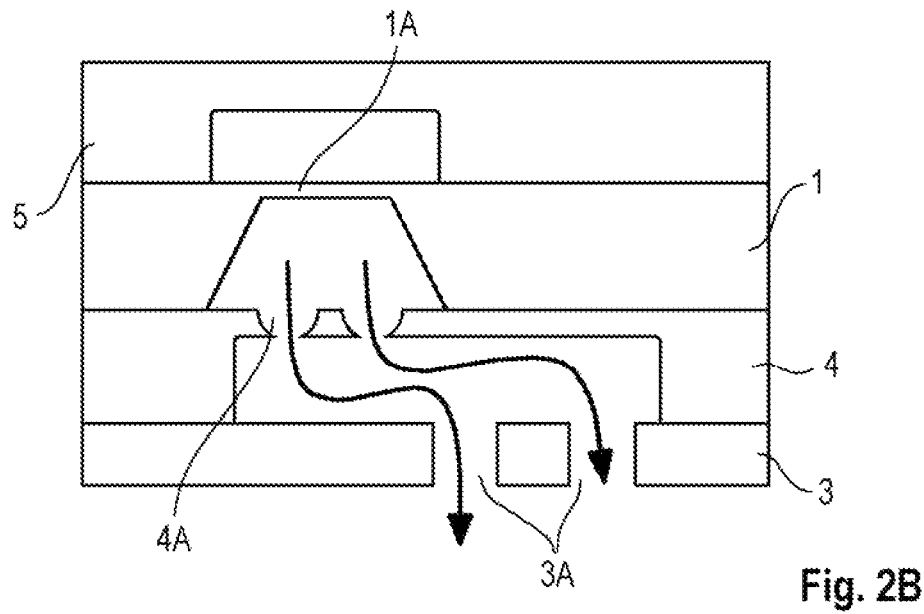
FIG. 2B shows an implementation in which the flame arrester is arranged laterally offset with respect to the sensor element.

FIG. 1 shows a lateral cross-sectional view of an example implementation of a gas sensor according to the first aspect and FIGS. 2A and 2B show the sensor element and the flame arrester in greater detail.

The gas sensor 10 is flange-mounted on a line 100, through which a water/hydrogen mixture flows and which may for example be the outlet line of a fuel cell. A protective layer 8, which may for example consist of a woven fabric or a nonwoven fabric, ensures that no spray water can penetrate from the line 100 into the gas sensor 10. The gas sensor 10 has a sensor element 1 for the detection of a gas such as hydrogen. This may be provided for example by a pressure sensor, which may be produced as an Si-MEMS element, which has a deflectable membrane 1A. The sensor element 1 may be arranged between two glass- or semiconductor-based substrates 4 and 5, which have been attached in particular by wafer bonding methods to the sensor element 1.

The gas sensor 10 also includes an encapsulation 2, which surrounds the sensor element 1 and the substrates 4 and 5 and has an opening 2A for the gas to be detected to pass through to the sensor element 1. A leadframe 3 is embedded in the encapsulation 2 and two of its lines are connected by way of bonding wires to the sensor element 1. The encapsulated sensor element 1 is mounted on a PCB 7. The heat generated by the sensor element 1 can be dissipated by way of the leadframe 3 (indicated in FIG. 1 by arrows) and the PCB 7.

The leadframe 3 extends over the opening 2A of the encapsulation 2 and has in this region through-openings 3A. Similarly, a first substrate 4, arranged between the sensor element 1 and the through-openings 3A, has through-openings 4A. Both through-openings 3A and 4A form a flame arrester, which is arranged in the opening 2A of the encapsulation 2. It is also conceivable to provide only one kind of through-openings, that is to say for example only through-openings 3A of the leadframe 3 and a substrate 4 with an open central passage or only through-openings in the substrate 4 and a leadframe 3 with an open central passage.

The first substrate 4 and the second substrate 5 may have a thickness in a range between 200 µm and 400 µm, while the leadframe 3 may have a thickness in a range between 100 µm and 300 µm. The through-openings 3A in the leadframe may be arranged regularly, for example, in the form of a matrix, over the leadframe 3 and have a diameter in a range between 50 µm and 300 µm. The through-openings 4A in the first substrate 4 may likewise be arranged regularly, for example, in the form of a matrix, and have a diameter in a range between 50 µm and 100 µm.

The sensor element 1 of the implementation of FIG. 1 and FIGS. 2A and 2B is formed as a pressure sensor with a deflectable membrane 1A. However, other sensor elements are also conceivable. In some implementations, the sensor element may also be configured as a thermal conductivity sensor, a sound velocity sensor, a pellistor, a catalytic sensor, a gas-selective sensor, a non-gas-selective sensor, an inductive sensor, a capacitive sensor, a resistive sensor, an optical sensor or a magnetic sensor.

According to the implementation of FIG. 2A, both the through-openings 4A of the first substrate 4 and the through-openings 3A of the leadframe 3 are arranged directly opposite the membrane 1A of the sensor element 1. As shown in FIG. 2B, however, a lateral offset may also be provided between the through-openings 4A of the first substrate 4 and the through-openings 3A of the leadframe 3. As indicated by the arrows, this offset alone forms a barrier for a potential flame spreading from the sensor element.

Figure 3:
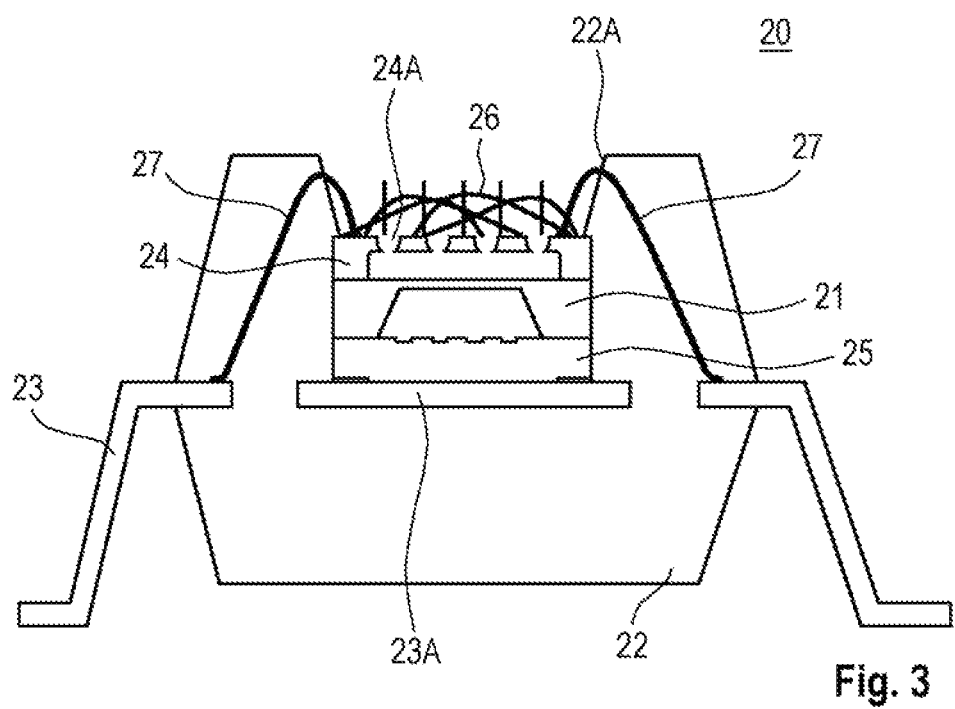
FIG. 3 shows a lateral cross-sectional view of an example implementation of a gas sensor according to the first aspect in which the flame arrester is formed by a network of bonding wires and openings in a glass substrate.

FIG. 3 shows a lateral cross-sectional view of an example implementation of a gas sensor according to the first aspect.

The gas sensor 20 of FIG. 3 has a sensor element 21, substrates 24 and 25 and an encapsulation 22, which may be fitted in relation to one another in just the same way as the sensor element 1, the substrates 4 and 5 and the encapsulation 2 of the gas sensor 10 of FIGS. 1 and 2. The gas sensor 20 also includes a leadframe 23, which has a pad 23A, which is embedded in the encapsulation 2 and to which the second substrate 25 has been applied. The first substrate 24 has through-openings 24A, which form a first part of a flame arrester. A second part of the flame arrester is formed by a network 26 of bonding wires, the network 26 being connected on two opposite sides by two bonding wires 27 to two terminals of the leadframe 23.

Figure 4:
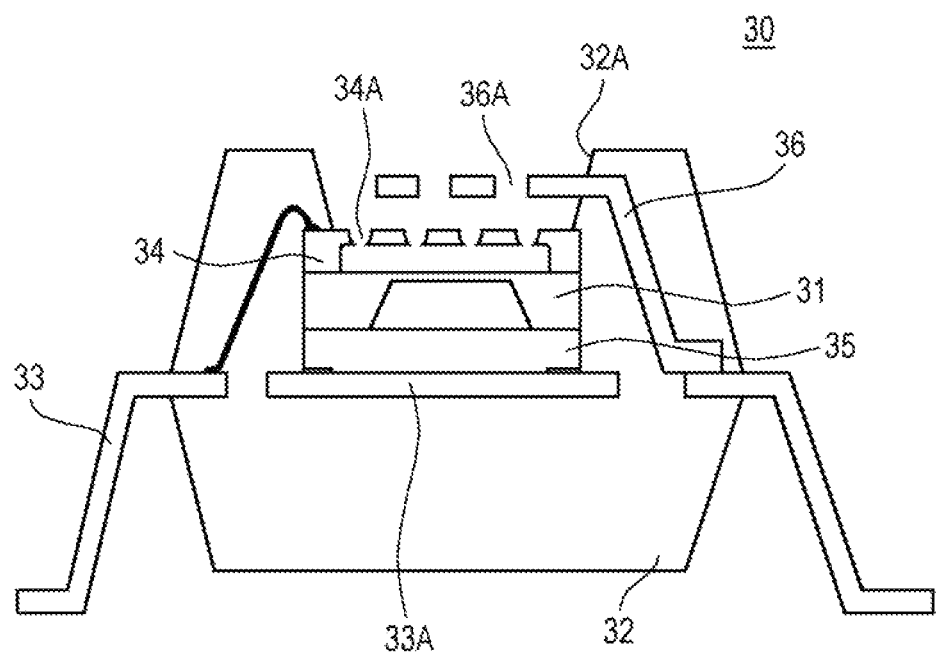
FIG. 4 shows a lateral cross-sectional view of an example implementation of a gas sensor according to the first aspect in which the flame arrester is formed by openings in a clip and openings in a glass substrate.

FIG. 4 shows a lateral cross-sectional view of an example implementation of a gas sensor according to the first aspect.

The gas sensor 30 of FIG. 4 has a sensor element 31, substrates 34 and 35 and an encapsulation 32, which may be fitted in relation to one another in just the same way as the sensor element 1, the substrates 4 and 5 and the encapsulation 2 of the gas sensor 10 of FIGS. 1 and 2. The gas sensor 30 also includes a leadframe 33, which has a pad 33A, which is embedded in the encapsulation 2 and to which the second substrate 35 has been applied. The first substrate 34 has through-openings 34A, which form a first part of a flame arrester. A second part of the flame arrester is formed by through-openings 36A of a clip 36, which at its lower portion is connected to the leadframe 33, at an upwardly sloping portion is embedded in the encapsulation and in an upper horizontal portion extends at least partially over the opening 2A of the encapsulation 2, the through-openings 36A being formed in this horizontal portion.

Figure 5:
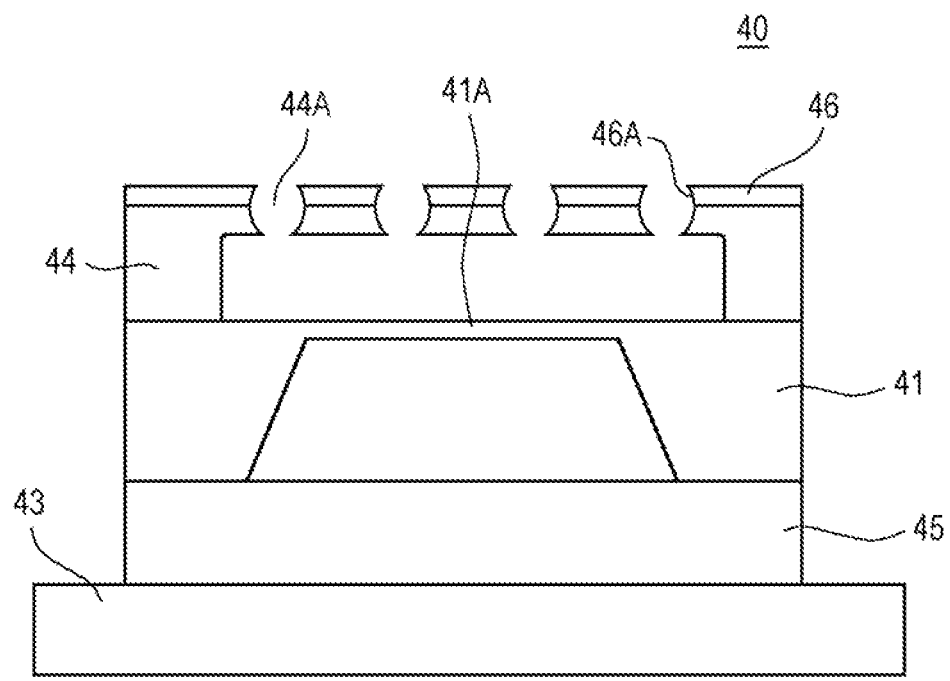
FIG. 5 shows a lateral cross-sectional view of an example implementation of a gas sensor according to the first aspect in which the flame arrester is formed by openings in a glass substrate and openings in a metallic layer.

FIG. 5 shows a lateral cross-sectional view of an example implementation of a gas sensor according to the first aspect.

The gas sensor 40 of FIG. 5 is similar in construction to the gas sensor of FIGS. 1 and 2, although the functionalities of the substrates 4 and 5 are reversed. Specifically, the gas sensor 40 of FIG. 5 has a sensor element 41 with a membrane 41A and substrates 44 and 45, which may be fitted in relation to one another in just the same way as the sensor element 1 and the substrates 4 and 5 of the gas sensor 10 of FIG. 1 and FIGS. 2A and 2B. The gas sensor 40 may also in just the same way have an encapsulation (not shown) and a leadframe, of which all that is shown here is a pad 43 to which the second substrate 45 has been applied, although it is also possible to dispense with the second substrate 45. The first substrate 44 has through-openings 44A, which form a flame arrester. On an upper surface of the first substrate 44 there may additionally have been applied a metallization layer 46, which has through-openings 46A, which are arranged above the through-openings 44A of the first substrate 44.

Figure 6:
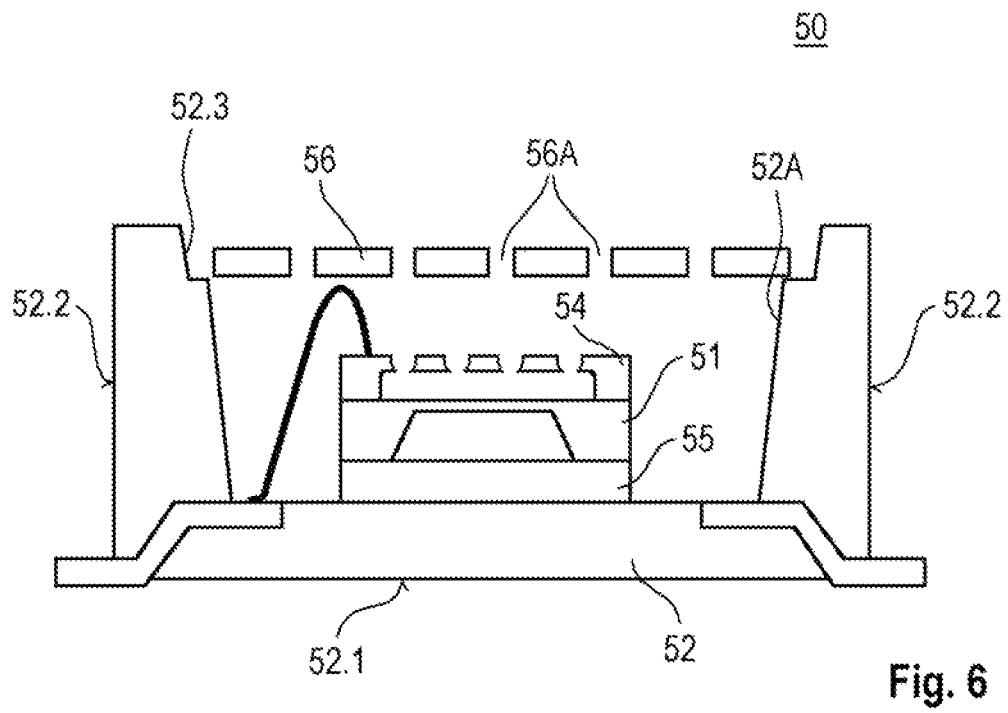
FIG. 6 shows a lateral cross-sectional view of an example implementation of a gas sensor according to the first aspect in which the flame arrester is formed by openings in a cover, which has been applied to the encapsulation.

FIG. 6 shows a lateral cross-sectional view of an example implementation of a gas sensor according to the first aspect.

The gas sensor 50 of FIG. 6 has a sensor element 51, substrates 54 and 55, which are fitted in a similar way to in the case of the gas sensor 40 of FIG. 5. Furthermore, the gas sensor 50 has an encapsulation 52, which has a bottom wall 52.1 and peripheral side walls 52.2, here the sensor element 51 and the substrates 54 and 55 being arranged on the bottom wall. In the upper region of the side walls 52.2, formed in the encapsulation 52 there is a peripheral ledge 52.3, into which a cover 56 can be fitted. Formed in the cover 56 are through-openings 56A, by which a flame arrester is formed. The through-openings 56A may be arranged regularly, in particular in the form of a matrix, over the cover 56.

Figure 7:
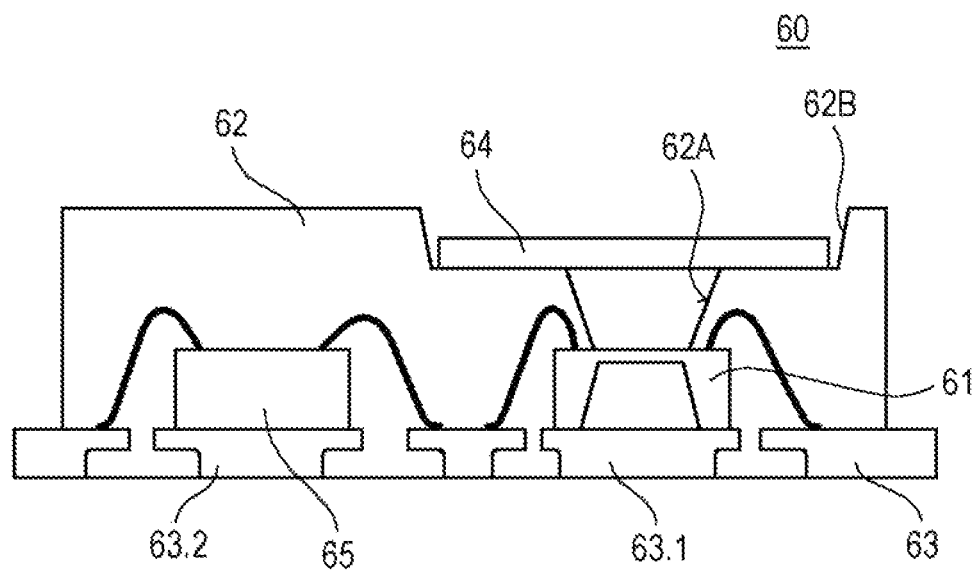
FIG. 7 shows a lateral cross-sectional view of an example implementation of a gas sensor according to the first aspect in which the flame arrester is formed by a flame-retardant layer, which has been applied to the encapsulation.

FIG. 7 shows a lateral cross-sectional view of an example implementation of a gas sensor according to the first aspect.

The gas sensor 60 of FIG. 7 has a sensor element 61 and an encapsulation 62, which surrounds the sensor element 61 and has an opening 62A for a gas to be detected to pass through to the sensor element 61. The encapsulation 62 has above the opening 62A a clearance 62B, placed in which is a flame-retardant layer 64, which acts as a flame arrester. The flame-retardant layer 64 may be produced from a plastic and may either be permeable per se to the gas to be detected or have through-openings. Furthermore, the gas sensor 60 has a leadframe 63, the sensor element 61 being arranged on a first pad 63.1 of the leadframe 63. The gas sensor 60 may also have an ASIC component 65, which is arranged on a second pad 63.2 of the leadframe 63. The electrical contact pads of the sensor element 61 and of the ASIC component 65 are connected by way of bonding wires to further portions of the leadframe 63.

Figure 8:
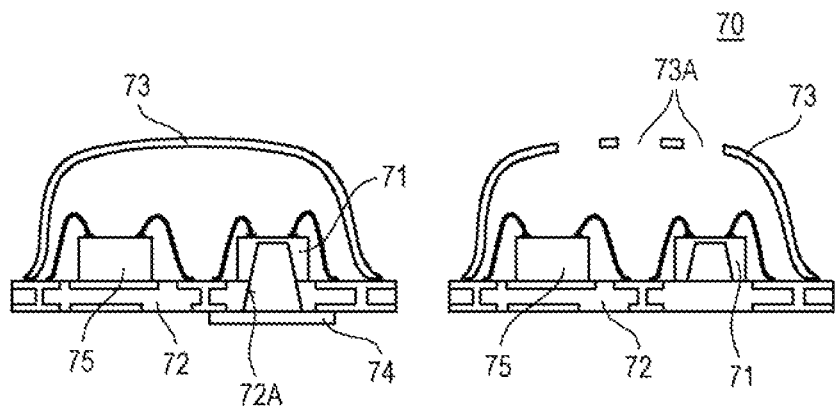
FIG. 8 shows a lateral cross-sectional view of an example implementation of a gas sensor according to the second aspect in which the flame arrester is formed by a flame-retardant layer before an opening in a laminate substrate (A) or by openings in a cover, which has been applied to the laminate substrate (B).

FIG. 8 shows lateral cross-sectional views of example implementations of a gas sensor according to the second aspect.

The gas sensor 70 of FIG. 8 has in both implementations a sensor element 71 which has been applied to a substrate 72 having a laminate layer. The laminate layer has an upper metallization layer and a lower metallization layer, metallic regions of the upper and lower metallization layers being connected to one another by way of vias in the laminate layer. Furthermore, the gas sensor 70 has a cover 73, which covers the sensor element 71 and is connected to the upper main surface of the substrate 72.

The flame arrester may be realized in two different ways. In the implementation in the left part of the image, a through-opening 72A is formed in the substrate 72 and a flame-retardant layer 74 is arranged in or over the through-opening 72A. The flame-retardant layer 74 may be produced from a plastic and may either be permeable per se to the gas to be detected or have through-openings. In the implementation in the right part of the image, instead through-holes 73A, by which the flame arrester is formed, are formed in the cover 73. In a way similar to the gas sensor 60 of FIG. 7, the gas sensor 70 may also have an ASIC component 75, which has likewise been applied to the substrate 72. The sensor element 71 and the ASIC component 75 may be connected by bonding wires to metallic regions of the upper metallization layer.

Figure 9A:
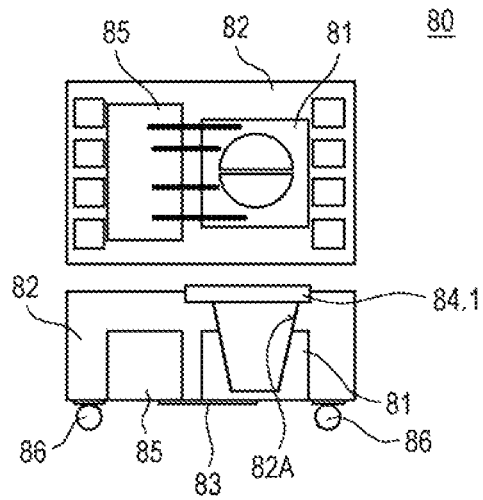
FIG. 9A shows a lateral cross-sectional view of an example implementation of a gas sensor according to the first aspect in which the flame arrester is formed by a flame retardant layer before an opening in an encapsulation and FIG. 9B shows a gas sensor according to the third aspect in which the flame arrester is formed by a flame-retardant layer in a redistribution layer.
Figure 9B:
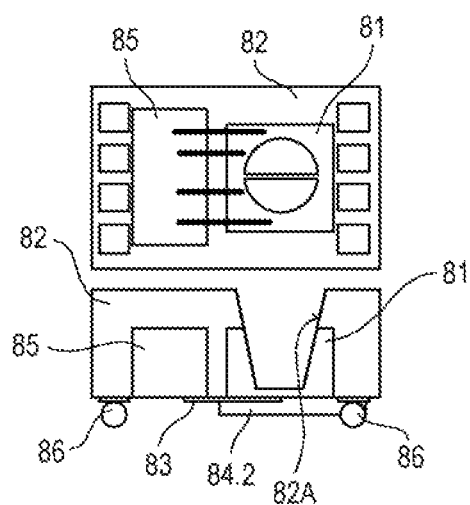

FIGS. 9A and 9B respectively show lateral cross-sectional views and views from above of example implementations of a gas sensor according to the first and third aspects. The upper part of both figures shows the view from above and the lower part shows the lateral cross-sectional view.

The gas sensor 80 of FIGS. 9A and 9B has in both implementations a sensor element 81, which together with an (optional) ASIC component 85 is embedded in an encapsulation 82, which has an opening 82A. On the lower surface of the encapsulation 82 there has been applied a metallic redistribution layer 83, by which the electrical contact pads of the sensor element 81 and of the ASIC component 85 are spatially redistributed to external terminal contacts 86, in this case solder balls.

The flame arrester may be realized in two different ways. In the implementation of FIG. 9A, arranged in or over the opening 82A of the encapsulation 82 through which the supply of gas is provided, there is a flame-retardant layer 84.1. In the implementation of FIG. 9B, the redistribution layer 83 has an opening and a flame-retardant layer 84.2 is arranged in or over the opening of the redistribution layer 83. Here, the gas supply is provided through the opening in the redistribution layer. The flame-retardant layer 84.1 or 84.2 may be produced from a plastic and may either be permeable per se to the gas to be detected or have through-openings.

Generally, a gas sensor as described above may be used for the detection of various gases, but in particular of hydrogen. The sensor may be attached in or on any kind of containers or lines in which gaseous hydrogen is kept or transported, in order in such a way for example to carry out leakage detection. An important application area is that of a fuel cell, and here in particular on a supply line or a discharge line to or from the fuel cell.

As a functional element, the flame arrester is an essential component part of the sensor, since with it safe operation is ensured. In the unforeseen event of a fault, further propagation of an explosion wavefront, and consequently greater damage to the car or injury to persons, is thereby prevented. All of the implementations shown here conform to this functional safety as required in safety standards such as for example ISO 26262.

ASPECTS

In the following, devices and methods according to the disclosure are explained based on aspects.

Aspect 1 is a gas sensor, comprising a sensor element for the detection of a gas, an encapsulation, which surrounds the sensor element and has an opening for a gas to be detected to pass through to the sensor element, and a flame arrester, which is arranged in the opening of the encapsulation.

Aspect 2 is a gas sensor according to aspect 1, also comprising a leadframe, which is embedded in the encapsulation, extends at least partly over the opening of the encapsulation and has in the region of the opening through-openings by which the flame arrester is at least partially formed.

Aspect 3 is a gas sensor according to aspect 1 or 2, also comprising a glass-based first substrate, which is attached to the sensor element and has in the region of the opening of the encapsulation through-openings by which the flame arrester is at least partially formed.

Aspect 4 is a gas sensor according to aspects 2 and 3 in which the leadframe is connected directly to the glass-based substrate.

Aspect 5 is a gas sensor according to aspect 3 or 4, also comprising a second glass-based substrate, which is attached to the sensor element on the side opposite from the first glass-based substrate.

Aspect 6 is a gas sensor according to one of the preceding aspects in which the flame arrester is arranged laterally offset with respect to the sensor element.

Aspect 7 is a gas sensor according to aspect 1 in which the flame arrester has a network of metallic wires, which extends at least partly over the opening of the encapsulation.

Aspect 8 is a gas sensor according to aspect 7 which has a leadframe, which is embedded in the encapsulation, and the network of metallic wires is connected by bonding wires to the leadframe.

Aspect 9 is a gas sensor according to aspect 1, also comprising a clip, which is embedded in the encapsulation, extends at least partly over the opening of the encapsulation and has in the region of the opening through-openings by which the flame arrester is at least partially formed.

Aspect 10 is a gas sensor according to aspect 1, also comprising a metallic cover, which is embedded in the encapsulation or secured by the encapsulation, extends at least partly over the opening (52A) of the encapsulation and has in the region of the opening (52A) through-openings (56A) by which the flame arrester is at least partially formed.

Aspect 11 is a gas sensor according to aspect 1, also comprising a flame-retardant layer, which is embedded in the encapsulation or secured by it and extends at least partly over the opening of the encapsulation and by which the flame arrester is at least partially formed.

Aspect 12 is a gas sensor according to one of the preceding aspects in which the flame arrester is electrically connected to the sensor element.

Aspect 13 is a gas sensor according to one of the preceding aspects in which the sensor element is formed as a MEMS element.

Aspect 14 is a gas sensor, comprising a substrate, which has a laminate layer, a sensor element, applied to a main surface of the substrate, for the detection of a gas, a cover, which covers the sensor element and is connected to the main surface of the substrate, and a flame arrester, which takes the form of through-holes in the cover, and/or a flame-retardant layer before an opening in the substrate.

Aspect 15 is a gas sensor, comprising a sensor element for the detection of a gas, an encapsulation, which surrounds the sensor element, external electrical contacts, a redistribution layer, which is arranged between the sensor element and the external electrical contacts and has an opening for a gas to be detected to pass through, and a flame-retardant layer, which is arranged in or before the opening of the redistribution layer.

Aspect 16 is a gas sensor according to one of the preceding aspects in which the sensor element has one or more elements from a group which includes a pressure sensor, a thermal conductivity sensor, a sound velocity sensor, a pellistor, a catalytic sensor, a gas-selective sensor, a non-gas-selective sensor, an inductive sensor, a capacitive sensor, a resistive sensor, an optical sensor, or a magnetic sensor.

Aspect 17 is the use of a gas sensor according to one of the preceding aspects for the detection of hydrogen.

Aspect 18 is the use according to aspect 17 in the case of a container or in the case of lines in which gaseous hydrogen is kept or transported.

Aspect 19 is the use of a gas sensor according to one of aspects 1 to 16 in the case of a fuel cell.

Aspect 20 is the use according to aspect 19, the gas sensor being attached to an inlet opening and/or an outlet opening of the fuel cell.

Although specific implementations have been illustrated and described here, those skilled in the art will know that a multiplicity of alternative and/or equivalent implementations can replace the specific implementations shown and described without exceeding the scope of the present disclosure. This application is intended to cover all modifications or variations of the specific implementations discussed herein. It is therefore intended that this disclosure is limited only by the claims and their equivalents.

What is claimed is:

1. A gas sensor, comprising
   a sensor element for detection of a gas, the sensor element comprising a first surface, a second surface situated opposite to the first surface, and a deflectable membrane arranged at the first surface;
   an encapsulation, which surrounds the sensor element and has an opening for the gas to be detected to pass through to the sensor element;
   a first substrate coupled to the first surface of the sensor element and arranged in the opening of the encapsulation, wherein the first substrate defines an open cavity that is coupled to the deflectable membrane for exposing the deflectable membrane to the gas, and wherein the first substrate has first through-openings arranged in a region of the opening of the encapsulation for enabling the gas to pass from the opening of the encapsulation to the deflectable membrane;
   a second substrate coupled to the second surface of the sensor element to define a closed cavity that is coupled to the deflectable membrane; and
   a flame arrester, which is arranged in the opening of the encapsulation and is formed at least partially by the first through-openings.

2. The gas sensor as claimed in claim 1, further comprising:
   a leadframe, which is embedded in the encapsulation and coupled to the first substrate, extends at least partly over the opening of the encapsulation and has, in a region of the opening, second through-openings by which the flame arrester is at least partially formed,
   wherein the first through-openings and the second through-openings are coupled by the open cavity.

3. The gas sensor as claimed in claim 2, wherein the first substrate is a first glass-based substrate.

4. The gas sensor as claimed in claim 3, in which
the leadframe is connected directly to the first glass-based substrate.

5. The gas sensor as claimed in claim 3, wherein the second substrate is a second glass-based substrate.

6. The gas sensor as claimed in claim 2,
wherein the first through-openings are laterally aligned with the deflectable membrane, and
the second through-openings are laterally offset from the first through-openings and the deflectable membrane to form a barrier against flames spreading from the sensor element.

7. The gas sensor as claimed in claim 1,
wherein the flame arrester includes a network of metallic wires that extends at least partly over the opening of the encapsulation and over the first through-openings,
where the network of metallic wires is coupled to opposite lateral sides of the first substrate.

8. The gas sensor as claimed in claim 7,
further comprising:
a leadframe that is embedded in the encapsulation and coupled to the second substrate, and wherein the network of metallic wires is connected by bonding wires to the leadframe.

9. The gas sensor as claimed in claim 1,
further comprising:
a clip that is embedded in the encapsulation, extends from the encapsulation at least partly over the opening of the encapsulation and over the first through-openings, and has, in a region of the opening, through-openings by which the flame arrester is at least partially formed.

10. The gas sensor as claimed in claim 1, further comprising:
a metallic cover,
wherein the metallic cover is embedded in the encapsulation or secured by the encapsulation,
wherein the metallic cover extends at least partly over the opening of the encapsulation and over the first substrate, and
wherein the metallic cover has, in a region of the opening of the encapsulation, through-openings, coupled to the first through-openings, by which the flame arrester is at least partially formed.

11. The gas sensor as claimed in claim 1, further comprising:
a flame-retardant layer, which is embedded in the encapsulation or is secured by the encapsulation and extends at least partly over the opening of the encapsulation and by which the flame arrester is at least partially formed.

12. The gas sensor as claimed in claim 1, wherein:
the flame arrester is electrically connected to the sensor element.

13. The gas sensor as claimed in claim 1, wherein:
the sensor element is formed as a MEMS element.

14. The gas sensor as claimed in claim 1, wherein:
the sensor element has one or more elements from a group which includes a pressure sensor, a thermal conductivity sensor, a sound velocity sensor, a pellistor, a catalytic sensor, a gas-selective sensor, a non-gas-selective sensor, an inductive sensor, a capacitive sensor, a resistive sensor, an optical sensor, or a magnetic sensor.

15. The gas sensor as claimed in claim 1, wherein the gas sensor is configured to detect hydrogen.

16. The gas sensor as claimed in claim 15, wherein the gas sensor is configured to detect gaseous hydrogen contained within a container or transported via lines in which gaseous hydrogen is transported.

17. The gas sensor as claimed in claim 1, wherein the gas sensor is configured to be included in a case of a fuel cell.

18. The gas sensor as claimed in claim 17, wherein the gas sensor is configured to be coupled to one or more of an inlet opening of the fuel cell or an outlet opening of the fuel cell.

* * * * *